United States Patent [19]

Fontana

[11] 4,383,694
[45] May 17, 1983

[54] GASKET FOR STATICALLY SEALING HIGH PRESSURE AND TEMPERATURE FLUIDS

[75] Inventor: Alvaro Fontana, Cerro Maggiore, Italy

[73] Assignee: Raimondi S.p.A., Milan, Italy

[21] Appl. No.: 242,009

[22] Filed: Mar. 9, 1981

[51] Int. Cl.³ .............................................. F16J 15/06
[52] U.S. Cl. ................................. 277/231; 277/213; 277/228; 277/234
[58] Field of Search ................... 277/227–234, 277/235 R, 235 A, 235 B, 236, 213

[56] References Cited

U.S. PATENT DOCUMENTS

| | | | |
|---|---|---|---|
| 935,387 | 9/1909 | Mastin | 277/227 |
| 2,327,837 | 8/1943 | Williams | 277/231 |
| 2,580,546 | 1/1952 | Hobson | 277/231 X |
| 2,969,997 | 1/1961 | Runton et al. | 277/227 X |
| 3,661,401 | 5/1972 | Farnam | 277/227 |

FOREIGN PATENT DOCUMENTS

| | | | |
|---|---|---|---|
| 840873 | 5/1970 | Canada | 277/227 |
| 149719 | 3/1904 | Fed. Rep. of Germany | 277/231 |
| 528420 | 6/1931 | Fed. Rep. of Germany | 277/231 |
| 688252 | 2/1940 | Fed. Rep. of Germany | 277/231 |

Primary Examiner—Robert S. Ward, Jr.
Attorney, Agent, or Firm—Guido Modiano; Albert Josif

[57] ABSTRACT

A gasket device for statically sealing high pressure and temperature fluids, comprising a metal liner shaped to define at least two cavities laid beside each other in inverted positions, wherein inserts of an elastic material are accommodated which protrude from the cavities and ensure a tight seal contact with mating surfaces on two flanged elements to be interconnected.

1 Claim, 3 Drawing Figures

GASKET FOR STATICALLY SEALING HIGH PRESSURE AND TEMPERATURE FLUIDS

BACKGROUND OF THE INVENTION

This invention relates to a gasket device for statically sealing high pressure and temperature fluids.

As is known, the problem of ensuring a tight seal against leakage and losses at the joints and connections along a fluid conveying line has been solved by employing suitable gaskets between the elements of the line which require static interconnection. Where the fluids being thus conveyed are in a high pressure and temperature condition, the problem of ensuring a tight seal is, of course, more serious as far as the gaskets are concerned.

Current techniques propose several solutions, which are not, however, devoid of drawbacks. In fact, the use of gaskets entirely formed from materials which are conventional for the intended application, such as rubber, elastomers, Teflon, etc., while being satisfactory from the standpoint of the leakproof property, has the serious drawback of providing inadequate flameproof features where the material of the gasket is exposed to the direct action of a hot fluid, and even if gaskets of asbestos or the like fibers are utilized, there occurs in time a progressive deterioration of the same, especially where high operating pressures prevail.

On the other hand, the use of gaskets merely formed from a soft metallic material, such as aluminum, copper, brass, mild steel, and the like, can indeed overcome the problem of gasket deterioration in the presence of hot gases or vapors, but introduces side problems of not negligible import, which originate from the difficulty of providing an effective seal across the metal-to-metal contact area between a flange and gasket, and from the need of accommodating high clamping forces, especially in the instance of high operating pressures, which implies an oversize connective structure.

Also known and utilized are gaskets formed from a corrugated sheet of soft metal, which gaskets are filled, in the hollows left between the corrugations, with a softer non-metallic material effective to improve the sealing properties of the gaskets. However, no effective retentive action is exerted on the latter material while the gasket is installed and subjected to compressive forces, and in most cases there occurs in operation a delamination of the softer material accompanied by a deterioration of the bond between it and the corrugated sheet metal, which results in the necessity of periodically replacing the gasket.

Alternatively, gaskets are also employed comprising a thin metal liner or shell, which partly surrounds or fully encloses an insert, e.g. of graphite-asbestos fibers or other suitable materials. In this case, the metal liner or shell, having either an open side or being completely closed, is arranged to ensure the geometrical integrity of the gasket, but at least across one face of the gasket there still exist a condition of metal-to-metal contact with the mating flanged element, which contact, depending on the nature of the fluid and on the clamping force applied to the gasket, may be insufficient to eliminate the leakage problem.

A partial solution to this problem, namely the metal-to-metal contact, may be provided with a suitable preparation of the surfaces against which the gasket is to rest, or with the use of special adhesive masses or oils for improving the contact, but all these approaches would introduce additional construction and assembling complications which stand far from the functional simplicity sought in such applications.

In the light of the foregoing considerations, it will appear that the solutions thus far proposed to improve the quality of the seal involve substantial manufacturing costs, and provide inferior reliability and durability features.

SUMMARY OF THE INVENTION

It is a primary object of this invention to eliminate the drawbacks affecting conventional static sealing systems, by providing a gasket device for statically sealing fluids, which affords a perfectly leakproof seal even in the presence of high temperatures and overpressures.

Another object of this invention is that of achieving a perfect seal both on perfectly smooth surfaces and relatively rough, but clean and oil- and adhesive-free, surfaces by means of a geometrically simple gasket element which is easy to manufacture and highly reliable in operation.

These and other objects are achieved by a gasket for statically sealing high pressure and temperature fluids, of the type having faces in direct contact with confronting sealing surfaces and flanks at least in part exposed to the action of said fluids, characterized in that it comprises a metal shell or liner shaped to define at least two side-by-side inverted cavities, thereby either cavity faces a respective one of said confronting sealing surfaces, and at least two inserts of an elastic material accommodated in respective ones of said cavities and protruding therefrom toward said confronting sealing surfaces, said metal shell or liner encircling the bottoms and flanks of said inserts.

BRIEF DESCRIPTION OF THE DRAWINGS

Further features and advantages will be more apparent from the description of a preferred but not limitative embodiment of a gasket for statically sealing high pressure and temperature fluids, according to the invention, illustrated by way of example only in the accompanying drawing, where.

DESCRIPTION OF THE PREFERRED EMBODIMENTS

Figure 1:
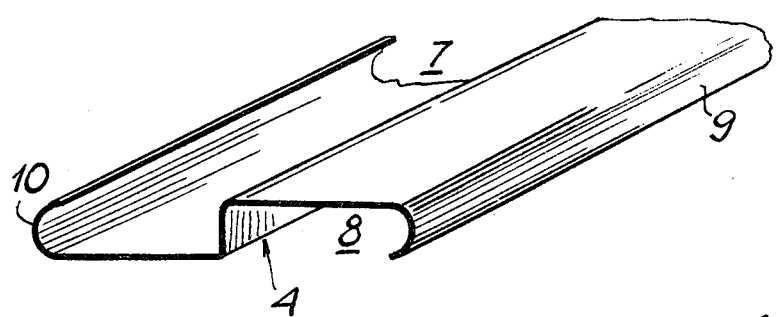
FIG. 1 is a perspective view of the metal liner or shell of the gasket according to this invention.

With reference to the drawing figures, there is generally indicated at 1 a gasket for statically sealing fluids according to the invention. More specifically, and as shown in FIG. 3, the gasket 1 is intended for installation between two flanged elements 2 and 3 which are fastened to each other by means of devices not shown.

Advantageously according to the invention, the gasket comprises a frame or casing 4 formed from a metal sectional stock, which frame constitutes the shaped metal liner or shell wherewith there are associated inserts 5 and 6 made of an elastic material, in particular of a gasket material such as rubber, vegetal fibers, Teflon, reinforced rubber, asbestos filaments, compressed grapite-asbestos, and other non metallic materials.

The material of the inserts will be selected in accordance with individual application requirements.

Figure 2:
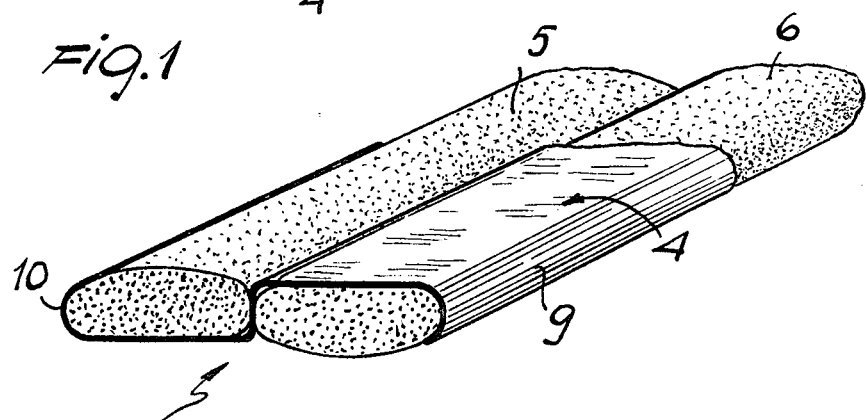
FIG. 2 is a fragmentary perspective view of a completed gasket according to the invention.
Figure 3:
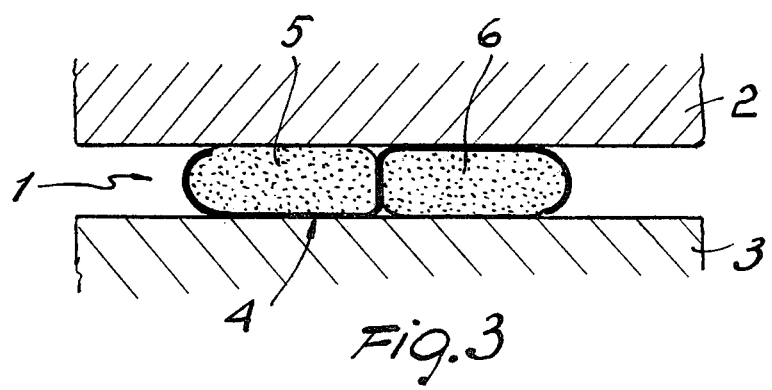
FIG. 3 is a cross-sectional view of this gasket as installed between two sealing surfaces.

Suitably according to the invention, said metal sectional frame 4 is so shaped as to define seats or recesses 7 and 8 intended for accommodating, as shown in FIGS. 2 and 3, said inserts 5 and 6 therein. The shape is such that the seats 7 and 8 have their bottoms alternately contacting the surfaces of said flanged elements 2 and 3. The metal sectional frame 4 has edges 9 and 10 turned over toward the inside of the seats 7 and 8, which they contribute to define, such as to contain and retain therein said inserts 5 and 6, leaving one face thereof uncovered. The two seats are separated by the central web of the frame 4 itself. As visible from the drawing the web extends perpendicular to bottoms of the seats 7 and 8, which are formed by wing portions extending in opposite direction from opposite ends of the web portion. Consequently the frame has a cross-sectional configuration which is substantially symmetrical about its center, and the recesses 7 and 8 and the respective inserts 5 and 6 have a generally substantially rectangular shape in cross-section. As visible from the drawing the inwardly bent end portions or edges 9, 10 have inwardly a concave and outwardly a convex shape.

The invention operates as follows.

The gasket 1 is interposed between the two flanged elements 2 and 3, which have to be connected in sealed relationship to each other, thereby with a suitable clamping action, the surfaces are brought into intimate or close mutual contact, in particular the inserts 5 and 6 against the surfaces of the flanged elements. In FIG. 3, the insert 5 provides the upper seal and the insert 6 the lower seal.

The edges of the inserts are protected from the influence of high temperature fluids by the turned over edge of the metal liner or shell holding such inserts. Moreover, the gasket is quite reliable, as far as its sealing properties are concerned, on account of the sealing effect being provided on both sides of said gasket by a metal-to-elastic material type of contact between the surfaces of the flanges 2 and 3 and the inserts 5 and 6. This type of contact, as explained in the preamble, provides the best dry-seal features, especially under high operating pressures.

The invention as described is suceptible to many modifications and variations without departing from the scope of the instant inventive concept. Thus, for example, said metal liner or shell may have a different form and shape from that shown. Consequently, the inserts may be more than two in number. Furthermore, all of the details may be replaced with other technically equivalent elements. In practicing the invention, the materials employed and the dimensions may be any ones, in accordance with individual requirements.

What is claimed is:

1. A composite gasket for statically sealing high pressure and temperature fluids of the type having a metallic casing defining recesses in which inserts of elastic material are arranged, the gasket having two opposite parallel frontal surfaces contacting in use opposite confronting sealing surfaces between which the gasket is clamped and two lateral surface at least one of which being exposed in use to the fluid to be sealed and wherein said recesses are arranged in side by side relationship to each other and wherein according to the improvement the casing defining said recesses has an intermediate web portion extending in use perpendicular to said confronting sealing surfaces, the casing having further a first wing like portion extending perpendicular to said web portion from one end thereof and at one side thereof and adapted in use to contact one of said sealing surfaces and a second wing like portion parallel to said first wing like portion and extending at the other side of said web portion from the other end thereof and adapted in use to contact the other of said sealing surfaces, each of said first and second wing portions having an inwardly bent end portion distant from said web portion and defining an outwardly convex and inwardly concave lateral surface of said gasket thereby to leave open said recesses opposite to said first and said second wing like portion thereof respectfully and each containing said insert of elastic material arranged normally slightly to project from the opening of the respective recess and opposite with respect to the other recess, said recesses and said inserts being thereby generally of substantially rectangular shape in cross-section.

* * * * *